(12) United States Patent
Tsutsumi et al.

(10) Patent No.: US 9,564,613 B2
(45) Date of Patent: Feb. 7, 2017

(54) ELECTRIC STORAGE DEVICE, ELECTRIC STORAGE APPARATUS, METHOD FOR PRODUCING ELECTRIC STORAGE DEVICE, AND METHOD FOR PRODUCING COVER PLATE

(71) Applicant: GS Yuasa International Ltd., Kyoto (JP)

(72) Inventors: Masakazu Tsutsumi, Kyoto (JP); Hidenori Shishido, Kyoto (JP)

(73) Assignee: GS YUASA INTERNATIONAL LTD., Kyoto-Shi, Kyoto (JP)

( * ) Notice: Subject to any disclaimer, the term of this patent is extended or adjusted under 35 U.S.C. 154(b) by 256 days.

(21) Appl. No.: 14/183,436

(22) Filed: Feb. 18, 2014

(65) Prior Publication Data
US 2014/0255758 A1  Sep. 11, 2014

(30) Foreign Application Priority Data
Feb. 20, 2013 (JP) ................. 2013-031289

(51) Int. Cl.
| | |
|---|---|
| H01M 10/0525 | (2010.01) |
| H01M 2/02 | (2006.01) |
| H01G 11/78 | (2013.01) |
| H01G 2/10 | (2006.01) |
| H01G 11/82 | (2013.01) |
| H01M 2/04 | (2006.01) |

(52) U.S. Cl.
CPC ............. *H01M 2/02* (2013.01); *H01G 2/10* (2013.01); *H01G 2/103* (2013.01); *H01G 11/78* (2013.01); *H01G 11/82* (2013.01); *H01M 2/0426* (2013.01); *H01M 2/0217* (2013.01); *H01M 2/0237* (2013.01); *Y02E 60/13* (2013.01); *Y10T 29/49108* (2015.01)

(58) Field of Classification Search
CPC ..................... H01M 10/0525; H01M 2/0434
See application file for complete search history.

(56) References Cited

U.S. PATENT DOCUMENTS

| | | | |
|---|---|---|---|
| 6,746,798 B1 * | 6/2004 | Hiratsuka | H01M 2/0426 429/163 |
| 8,518,579 B2 | 8/2013 | Kim et al. | |
| 8,623,545 B2 | 1/2014 | Kim et al. | |
| 2006/0110538 A1 | 5/2006 | Yokoi et al. | |
| 2010/0028759 A1 | 2/2010 | Ebine et al. | |
| 2010/0233528 A1 | 9/2010 | Kim et al. | |
| 2011/0039152 A1 | 2/2011 | Kim et al. | |
| 2011/0250485 A1 | 10/2011 | Tsukuda | |

(Continued)

FOREIGN PATENT DOCUMENTS

| | | |
|---|---|---|
| JP | 10-269999 A | 10/1998 |
| JP | 2002-184379 A | 6/2002 |

(Continued)

*Primary Examiner* — Stewart Fraser
*Assistant Examiner* — Olatunji Godo
(74) *Attorney, Agent, or Firm* — McGinn IP Law Group, PLLC.

(57) ABSTRACT

The electric storage device according to the present invention includes a case having a case body and a cover plate, the case body includes a step portion at an opening edge, the cover plate includes a projection that is inserted into the opening of the case body, and a portion of the projection opposes the step portion within the case body.

11 Claims, 21 Drawing Sheets

(56) References Cited

U.S. PATENT DOCUMENTS

2012/0321922 A1 12/2012 Kim et al.

FOREIGN PATENT DOCUMENTS

| | | | |
|---|---|---|---|
| JP | 2002-329484 | A | 11/2002 |
| JP | 2005-332700 | A | 12/2005 |
| JP | 2006-156124 | A | 6/2006 |
| JP | 2008-159536 | A | 7/2008 |
| JP | 2009-266695 | A | 11/2009 |
| JP | 2010-027436 | A | 2/2010 |
| JP | 2010-212240 | A | 9/2010 |
| JP | 2010-225372 | A | 10/2010 |
| JP | 2011-40381 | A | 2/2011 |
| JP | 2011-204396 | A | 10/2011 |
| JP | 2011-238504 | A | 11/2011 |
| JP | 2012-104414 | A | 5/2012 |
| JP | 2012-186005 | A | 9/2012 |
| JP | 2012-199021 | A | 10/2012 |
| JP | 2013-105674 | A | 5/2013 |

\* cited by examiner

ELECTRIC STORAGE DEVICE, ELECTRIC STORAGE APPARATUS, METHOD FOR PRODUCING ELECTRIC STORAGE DEVICE, AND METHOD FOR PRODUCING COVER PLATE

CROSS-REFERENCE TO RELATED APPLICATION

This application claims priority to Japanese Patent Application No. 2013-31289, the disclosure of which is incorporated herein by reference in its entirety.

FIELD

The present invention relates to an electric storage device including: an electrode assembly; and a case including a case body that houses the electrode assembly and a cover plate that covers an opening of the case body, and to an electric storage apparatus including such an electric storage device, a method for producing an electric storage device, and a method for producing a cover plate.

BACKGROUND

In recent years, rechargeable electric storage devices such as battery cells (lithium ion battery cells, nickel hydrogen battery cells, etc.) and capacitors (electric double layer capacitors, etc.) are employed as a power source, for example, for vehicles (automobiles, motorcycles, etc.) and various equipment (mobile terminals, laptop computers, etc.).

For example, a battery cell (can-type battery cell) disclosed in Patent Literature 1 includes: an electrode assembly (power generating element); and a case (housing case) having a case body (can) that houses the electrode assembly and a cover plate (cover) that closes an opening of the case body. In a method for producing such a case body, an unnecessary portion such as a burr remains at an opening edge of the opening of the case body. This unnecessary portion is subjected to machining such as trimming, so as to be cut off from the opening edge of the opening of the case body. Therefore, a step portion that is one step lower than other portions of the opening edge of the opening that have not undergone machining may be formed in some cases at the opening edge of the opening where the unnecessary portion has been present.

In such a case, this step portion forms a gap between the cover plate and the opening edge of the opening of the case body, when the cover plate is placed on the opening of the case body. Eventually, when a seam between the cover plate and the opening edge of the opening of the case body is laser welded, the laser beam penetrates through the gap into the case. Thereby, the laser beam may possibly affect the contents such as a resin plate provided within the case.

The step portion formed at the opening edge of the opening of the case body also includes a step portion formed in a portion of the opening for optically detecting the orientation of the case, in addition to the above-mentioned step portion. Such a step portion also has a possibility of affecting the contents.

A battery cell (rectangular battery cell) disclosed in Patent Literature 2 includes an electrode assembly (battery element), a case body (body case) that houses the electrode assembly, and a cover plate (cover) that closes an opening of the case body. The cover plate is provided with a base portion projecting toward the inside of the case body. This battery case is sealed by fitting the base portion of the cover plate into the opening of the case body.

Therefore, when the seam between the cover plate and the opening edge of the opening of the case body is laser welded, even if the laser beam has passed through this gap, the base portion of the cover plate blocks the way of the laser beam. Therefore, the laser beam does not penetrate into the contents within the case.

However, the base portion of Patent Literature 2 planarly projects uniformly from the cover plate toward the inside of the case body. Therefore, a capacity equivalent to the volume of the base portion is not available as a capacity to house the electrode assembly within the case. That is, the capacity equivalent to the volume of the base portion of the cover plate is lost from the capacity of the case. Since the capacity equivalent to the volume of the base portion of the cover plate does not contribute to the electricity storage by the battery cell, the electric storage capacity per unit volume of the battery cell is reduced.

Such problems are not limited to batteries, and the same problems apply also to capacitors (such as electric double layer capacitors).

CITATION LIST

Patent Literature 1: JP 2005-332700 A
Patent Literature 2: JP 10 (1998)-269999 A

SUMMARY

The present invention aims to provide an electric storage device, an electric storage apparatus, a method for producing an electric storage device, and a method for producing a cover plate, which are capable of suppressing a reduction in capacity inside the case and preventing, when a seam between an opening edge of an opening of a case body and a cover plate covering the opening is laser welded, the laser beam from penetrating into contents within a case.

The following presents a simplified summary of the invention disclosed herein in order to provide a basic understanding of some aspects of the invention. This summary is not an extensive overview of the invention. It is intended to neither identify key or critical elements of the invention nor delineate the scope of the invention. Its sole purpose is to present some concepts of the invention in a simplified form as a prelude to the more detailed description that is presented later.

An the electric storage device according to an aspect of the present invention includes: an electrode assembly including a positive electrode plate and a negative electrode plate that are insulated from each other; and a case that houses the electrode assembly, wherein the case includes a case body having an opening, and a cover plate that is placed on an opening edge of the opening of the case body so as to cover the opening, the case body includes a step portion at the opening edge, the cover plate includes a projection that is inserted into the opening of the case body, a portion of the projection opposes the step portion within the case body, and a seam between the cover plate and the opening edge of the case body is laser welded in at least the step portion.

BRIEF DESCRIPTION OF DRAWINGS

The foregoing and other features of the present invention will become apparent from the following description and drawings of an illustrative embodiment of the invention in which.

DESCRIPTION OF EMBODIMENTS

Figure 1:
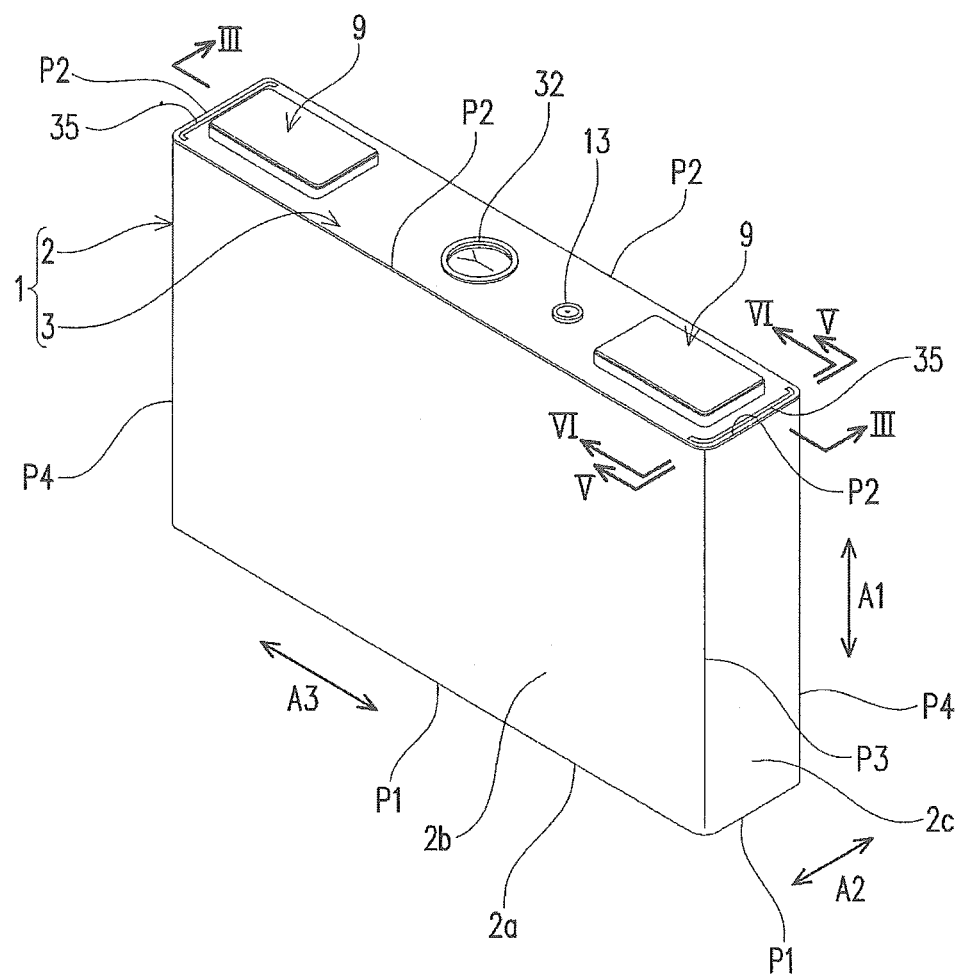
FIG. 1 is a perspective view of a battery cell according to an embodiment of the present invention.

The electric storage device according to an aspect of this embodiment includes: an electrode assembly including a positive electrode plate and a negative electrode plate that are insulated from each other; and a case that houses the electrode assembly, wherein the case includes a case body having an opening, and a cover plate that is placed on an opening edge of the opening of the case body so as to cover the opening, the case body includes a step portion at the opening edge, the cover plate includes a projection that is inserted into the opening of the case body, at least a portion of the projection opposes the step portion within the case body, and a seam between the cover plate and the opening edge of the case body is laser welded in at least the step portion.

According to such a configuration, when the cover plate is placed on the opening edge of the opening of the case body, a gap is formed between the cover plate and the opening edge due to the step portion provided at the opening edge of the case body. However, the projection of the cover plate is arranged inside the gap as seen from the outside of the case body. Therefore, when the seam between the cover plate and the opening edge of the opening of the case body is laser welded, even if the laser beam has passed through this gap, the way of the laser beam is blocked by the projection of the cover plate, and it does not enter the inside of the case over the projection. Moreover, the projection is merely provided partially on the cover plate, and thus only a capacity equivalent to the volume of the projection is lost partially from the capacity of the case. As a result, the capacity inside the case is not significantly reduced.

According to another aspect, the electric storage device of this embodiment may have a configuration in which the cover plate includes a recess on an outer surface side of the portion where the projection is provided.

When the projection is provided on the cover plate, the weight of the cover plate may well increase to the extent corresponding to the volume of the projection. However, according to the above-mentioned configuration, since the recess is provided on the outer surface side of the portion where the projection is provided, the weight can be reduced to the extent corresponding to the capacity of the recess. Accordingly, the projection can block the laser beam so as to prevent the penetration of the laser beam into the contents of the case, while the recess suppresses the increase in weight of the cover plate.

According to another aspect, the electric storage device of this embodiment may have a configuration in which the case body has a bottomed rectangular tubular shape, the step portion extends over at least one entire side of the opening edge of the case body, and the projection is formed at a position corresponding to the at least one side.

In this way, when the case body has a bottomed rectangular tubular shape, the step portion is formed over at least one entire side of the sides constituting the polygonal opening edge of the case body. At this time, the gap is formed between the cover plate and the side of the opening edge. However, according to the above-mentioned configuration, the projection of the cover plate is arranged inside the gap as seen from the outside of the case body. Therefore, even if the laser beam has passed through this gap in the laser welding, the way of the laser beam is blocked by the projection of the cover plate, and thus the laser beam does not enter the inside of the case over the projection. Moreover, the projection is merely formed partially therein corresponding to the side of the opening edge of the case body where the step portion is formed. Thus, only a capacity equivalent to the volume of the projection is lost partially from the capacity of the case. As a result, the capacity inside the case is not significantly reduced.

In this case, the configuration may be such that the case body has a bottomed quadrangular tubular shape, the step portion extends over each of a pair of opposed entire sides of the opening edge of the case body, and the projection is formed on the cover plate at a position corresponding to at least the pair of sides.

When the case body has a bottomed quadrangular tubular shape as above, the step portion is formed extending over each of the pair of opposed entire sides of the sides that constitute the quadrangular opening edge of the case body, and the gap is formed between the cover plate and at least a pair of sides of the four sides that constitute the opening edge. However, the projection of the cover plate is arranged inside the gap as seen from the outside of the case body. Therefore, even if the laser beam has passed through this gap in the laser welding, the way of the laser beam is blocked by the projection of the cover plate, and thus the laser beam does not enter the inside of the case over the projection. Moreover, the projection is merely formed partially therein corresponding to each of the pair of sides of the opening edge of the case body where the step portion is formed. Therefore, only a capacity equivalent to the volume of the projection is lost partially from the capacity of the case. As a result, the capacity inside the case is not significantly reduced.

According to another aspect, the electric storage device of this embodiment may have a configuration in which the projection has an annular shape that extends along the opening edge of the case body.

According to such a configuration, even if the step portion is formed at any position of the opening edge of the case body, the projection of the cover plate is arranged inside the gap formed between the cover plate and the opening edge. Therefore, even if the laser beam has passed through this gap in the laser welding, the way of the laser beam is blocked by the projection of the cover plate, and thus the laser beam does not enter the inside of the case over the projection. Moreover, since the projection is merely formed to have an annular shape that extends along the inside of the opening edge of the case body, only a capacity equivalent to the volume of the projection is lost partially from the capacity of the case. As a result, the capacity inside the case is not significantly reduced.

According to still another aspect, the electric storage device of this embodiment may have a configuration in which the projection is in contact with or adjacent to an inner surface of the opening edge of the case body.

According to such a configuration, the projection of the cover plate placed on the opening edge of the opening of the case body abuts the inner surface of the opening edge of the case body, thereby allowing the cover plate to be positioned at a specific position.

According to another aspect, the electric storage device of this embodiment may have a configuration in which the cover plate further includes a case inner side portion that is inserted into the opening of the case body and is in contact with or adjacent to the inner surface of the opening edge, and the projection projects from the case inner side portion.

According to such a configuration, the case inner side portion of the cover plate placed on the opening edge of the opening of the case body abuts the inner surface of the opening edge of the case body, thereby allowing the cover plate to be positioned at a specific position. Further, the projection having a height increased by the case inner side portion is arranged inside the gap formed between the cover plate and the opening edge. Therefore, even if the laser beam has passed through this gap in the laser welding, the way of the laser beam is blocked by either the case inner side portion or the projection. This prevents the laser beam from entering the inside of the case over the end of the case inner side portion or the projection.

According to another aspect, the electric storage device of this embodiment may have a configuration in which the projection is locally located in a vicinity of a circumference edge of the cover plate.

According to such a configuration, the projection is merely provided locally in the circumference edge portion of the cover plate, and thus only a capacity equivalent to the volume of the projection is lost partially from the capacity of the case. As a result, the capacity inside the case is not significantly reduced.

According to another aspect, the electric storage device of this embodiment may have a configuration in which the projection has an outer circumferential edge spaced at a distance from the inner surface of the opening edge.

According to another aspect, the electric storage device of this embodiment may have a configuration in which the projection has a linear shape that extends along the opening edge of the case body.

According to such a configuration, since the projection merely has a projecting shape that extends along the opening edge of the case body, only a capacity equivalent to the volume of the projection is lost partially from the capacity of the case. As a result, the capacity inside the case is not significantly reduced.

According to another aspect, the electric storage device of this embodiment may have a configuration in which the projection has a tip in the projecting direction with an arcuate cross section.

According to such a configuration, it is possible to suppress the generation of metal powder, etc., due to the abrasion between the projecting ridge and the inner side of the case body when the cover plate is fitted into the case body.

An electric storage apparatus according to this embodiment includes: at least two electric storage devices including at least one electric storage device according to any one of the above-described aspects; and a coupling member that couples the at least two electric storage devices to each other.

A method for producing an electric storage device according to this embodiment, in which the electric storage device includes: an electrode assembly including a positive electrode plate and a negative electrode plate that are insulated from each other; and a case that houses the electrode assembly and includes a case body having an opening, and a cover plate configured to cover the opening of the case body, includes: a step of irradiating a seam between the cover plate and an opening edge of the opening of the case body with a laser, with the cover plate being placed on the opening edge of the opening of the case body, wherein the case body includes a step portion at the opening edge, the cover plate includes a projection that is inserted into the opening of the case body, at least a portion of the projection opposes the step portion within the case body, and the seam is irradiated with the laser at a position corresponding to the step portion in the laser irradiation step.

According to such a configuration, when the cover plate is placed on the opening edge of the opening of the case body, a gap is formed between the cover plate and the opening edge due to the step portion provided at the opening edge of the case body. However, the projection of the cover plate is arranged inside the gap as seen from the outside of the case body. Therefore, when the seam between the cover plate and the opening edge of the opening of the case body is laser welded, even if the laser beam has passed through this gap, the way of the laser beam is blocked by the projection of the cover plate, and it does not enter the inside of the case over the projection.

According to one aspect, the method for producing an electric storage device of this embodiment may have a configuration in which the projection is formed by coining the cover plate from its outer surface toward its inner surface.

Such a configuration can suppress an increase in weight of the cover plate by providing the projection.

According to another aspect, the method for producing an electric storage device of this embodiment may have a configuration in which a circumference edge portion of the cover plate, which is placed on the opening edge of the case body, is subjected to compression molding.

According to such a configuration, the circumference edge portion of the cover plate is subjected to compression molding, so as to have a thickness smaller than the other portions. Therefore, when the circumference edge portion of the cover plate is placed on the opening edge of the opening of the case body, the portions other than the circumference edge portion of the cover plate relatively enter the inside of the case body. Thus, the height of the projection is increased to the extent that the cover plate has entered the inside of the case body. As a result, even if the laser beam has passed through this gap in the laser welding, the way of the laser beam is more reliably blocked by the projection of the cover plate having an increased height.

According to another aspect, the method for producing an electric storage device of this embodiment may have a configuration in which the projection is locally located in a vicinity of a circumference edge of the cover plate.

According to such a configuration, the projection is merely provided locally in the circumference edge portion of the cover plate, and thus only a capacity equivalent to the volume of the projection is lost partially from the capacity of the case. As a result, the capacity inside the case is not significantly reduced.

According to another aspect, the method for producing an electric storage device of this embodiment may have a configuration in which the projection has an outer circumferential edge spaced at a distance from the inner surface of the opening edge.

According to another aspect, the method for producing an electric storage device of this embodiment may have a configuration in which the projection has a linear shape that extends along the opening edge of the case body.

According to such a configuration, since the projection merely has a projecting shape that extends along the opening edge of the case body, only a capacity equivalent to the volume of the projection is lost partially from the capacity of the case. As a result, the capacity inside the case is not significantly reduced.

According to another aspect, the method for producing an electric storage device of this embodiment may have a configuration in which the projection has a tip in the projecting direction with an arcuate cross section.

According to such a configuration, it is possible to suppress the generation of metal powder, etc., due to the abrasion between the projecting ridge and the inside of the case body when the cover plate is fitted into the case body.

According to another aspect, the method for producing an electric storage device of this embodiment may have a configuration in which the cover plate includes a case inner side portion that is inserted into the opening of the case body, and a thin portion that is formed around a circumference edge of the cover plate and has a thickness smaller than the case inner side portion, the projection projects from the case inner side portion, and $H2 \geq H1+H3-H0$ is satisfied, when a dimension in the thickness direction of the case inner side portion is H0, a dimension in the thickness direction of the thin portion is H1, a dimension in the thickness direction of the projection is H2, and a height difference in the thickness direction of the step portion is H3.

According to such a configuration, the inner side portion or the projection of the cover plate is reliably arranged inside the gap between the cover plate and the opening edge of the case body as seen from the outside of the case body.

A method for producing a cover plate according to this embodiment is a method for producing a cover plate configured to cover an opening of a case body that houses an electrode assembly including a positive electrode plate and a negative electrode plate that are insulated from each other, and the method includes forming a projection that opposes, within the case body, a step portion formed at an opening edge of the opening of the case body, with the cover plate being placed on the opening edge, by coining the cover plate at a corresponding position from its outer surface toward its inner surface.

According to such a configuration, when the cover plate is placed on the opening edge of the opening of the case body, a gap is formed between the cover plate and the opening edge due to the step portion provided at the opening edge of the case body. However, the projection of the cover plate is arranged inside the gap as seen from the outside of the case body. Therefore, when the seam between the cover plate and the opening edge of the opening of the case body is laser welded, even if the laser beam has passed through this gap, the way of the laser beam is blocked by the projection of the cover plate. This prevents the laser beam from entering the inside of the case over the projection. Moreover, the projection is formed by coining the cover plate, and therefore the weight of the cover plate does not increase due to providing the projection. Therefore, the capacity inside the case is not reduced.

According to one aspect, the method for producing a cover plate of this embodiment may have a configuration in which a circumference edge portion of the cover plate, which is placed on the opening edge of the case body, is subjected to compression molding.

According to such a configuration, the circumference edge portion of the cover plate is subjected to compression molding, thereby allowing the portions other than the circumference edge portion of the cover plate to relatively enter the inside of the case body. Thus, the height of the projection is increased to the extent that the cover plate has entered the inside of the case body. As a result, even if the laser beam has passed through this gap in the laser welding, the way of the laser beam is blocked by the projection of the cover plate having an increased height, so that the laser beam does not enter the inside of the case.

As has been described above, according to this embodiment, it is possible to prevent the laser beam from penetrating into the contents inside the case, when the seam between the cover plate and the opening edge of the opening of the case body is laser welded, without reducing the electric storage capacity.

Hereinafter, a battery cell as an embodiment of the electric storage device according to the present invention is described with reference to the drawings. The battery cell according to this embodiment is a non-aqueous electrolyte secondary battery cell, more specifically, a lithium ion secondary battery cell. As shown in FIG. 1 to FIG. 8, the battery cell according to this embodiment includes a case 1 composed of a case body 2 having an opening, and a cover plate 3 that is placed on an opening edge of the opening of the case body 2 so as to close and seal the opening. Further, the battery cell includes an electrode assembly 4 housed within the case 1 and a terminal structure 9 that is provided on the cover plate 3 so as to be electrically connected with the electrode assembly 4.

Figure 2:
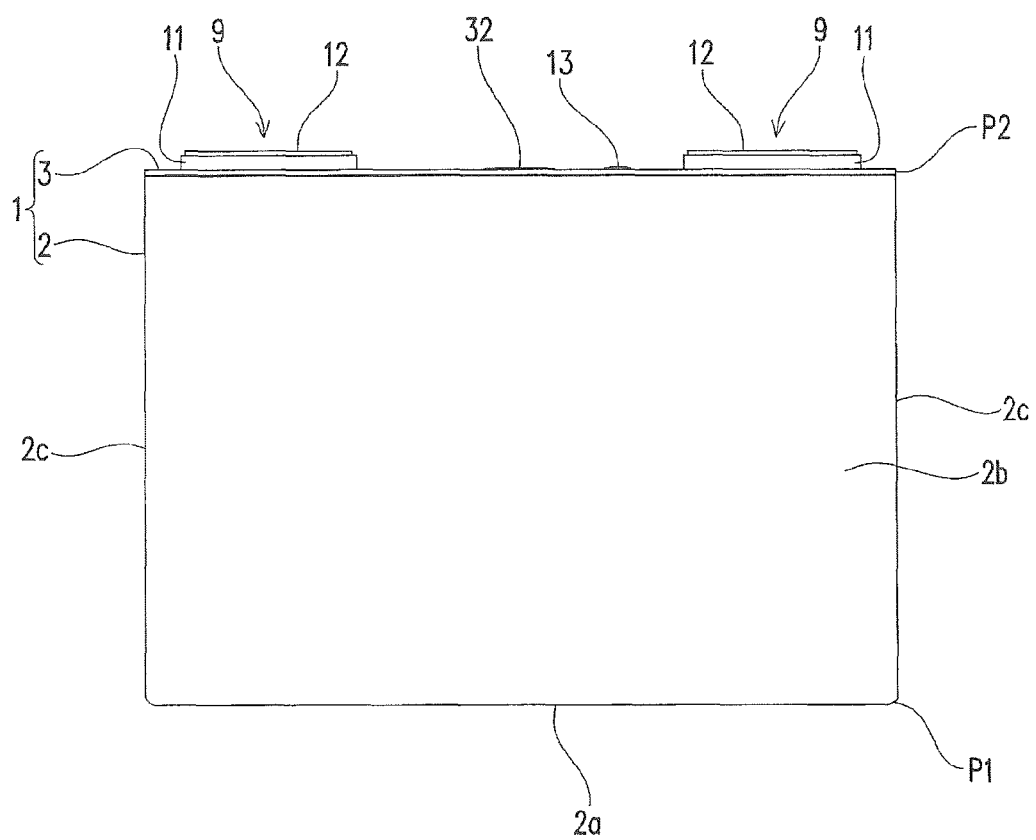
FIG. 2 is a side view of the battery cell according to the embodiment.
Figure 3:
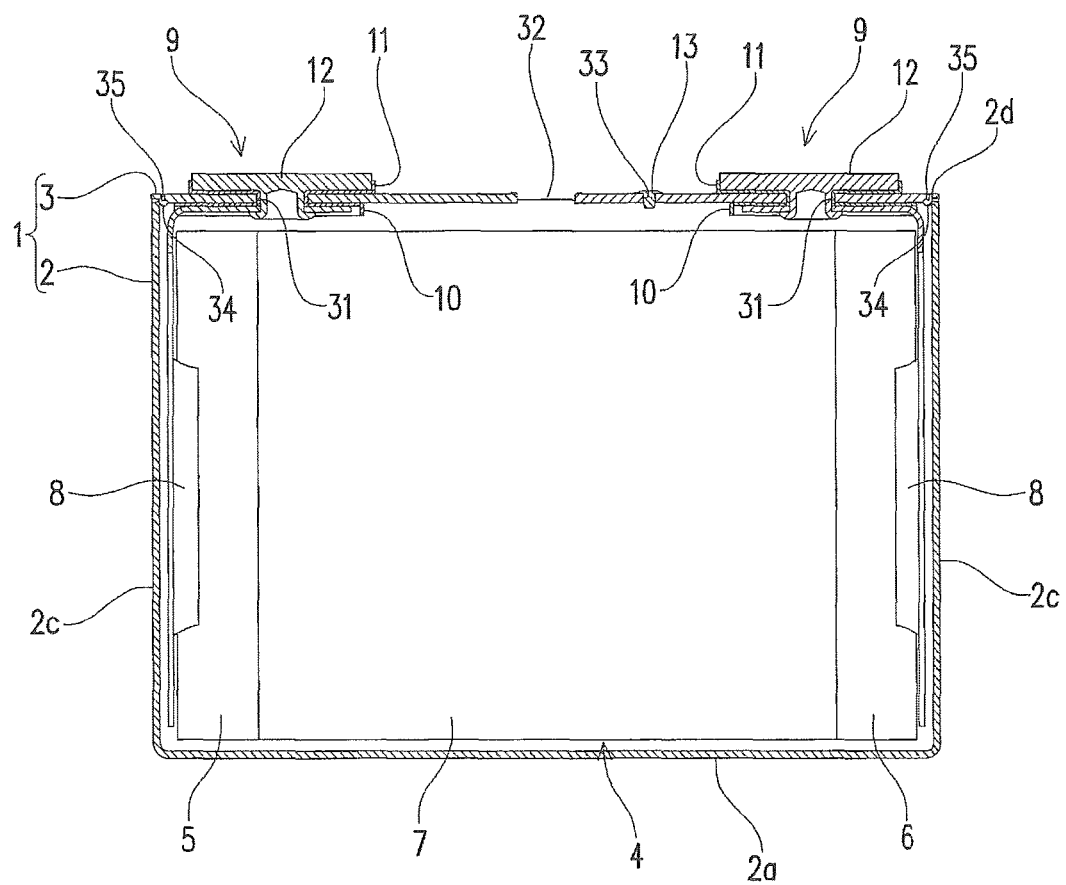
FIG. 3 is a sectional view, taken along the line in FIG. 1, of the battery cell according to the embodiment.

The case body 2 and the cover plate 3 of the case 1, for example, are made of aluminum or an aluminum-based metal material such as aluminum alloy. As shown in FIG. 1 to FIG. 3, the case body 2 has a bottomed rectangular tubular shape that is flattened in the width direction so as to house the electrode assembly 4 of a wound type with an elongated cylindrical shape. The cover plate 3 is a plate member having a rectangular shape corresponding to the shape of the opening of the case body 2.

The case body 2 has a pair of opposed side plates 2b and a pair of opposed end plates 2c that are erected from the circumference edge of a rectangular bottom 2a in the first direction A1 (height direction). The pair of end plates 2c are erected from the edge of the bottom 2a that extends along a second direction A2 that is the short direction of the rectangular bottom 2a. Further, the pair of side plates 2b are erected from the edge of the bottom 2a that extends along a third direction A3 that is the longitudinal direction of the bottom 2a. The case body 2 is formed to have a thin bottomed quadrangular tubular shape with a small depth by having the pair of end plates 2c with a smaller width (than the pair of side plates 2b).

The pair of side plates 2b each have a first side P1 provided on the bottom 2a side, a second side P2 opposing the first side P1, and a pair of sides P3 and P4 extending along the first direction A1. Likewise, the pair of end plates 2c each have a first side P1 provided on the bottom 2a side, a second side P2 opposing the first side P1, and a pair of sides P3 and P4 extending along the first direction A1. An opening 2d corresponding to the bottom 2a is formed in the region surrounded by the second sides P2 of the pair of side plates 2b and the second sides P2 of the pair of end plates 2c.

Figure 8:
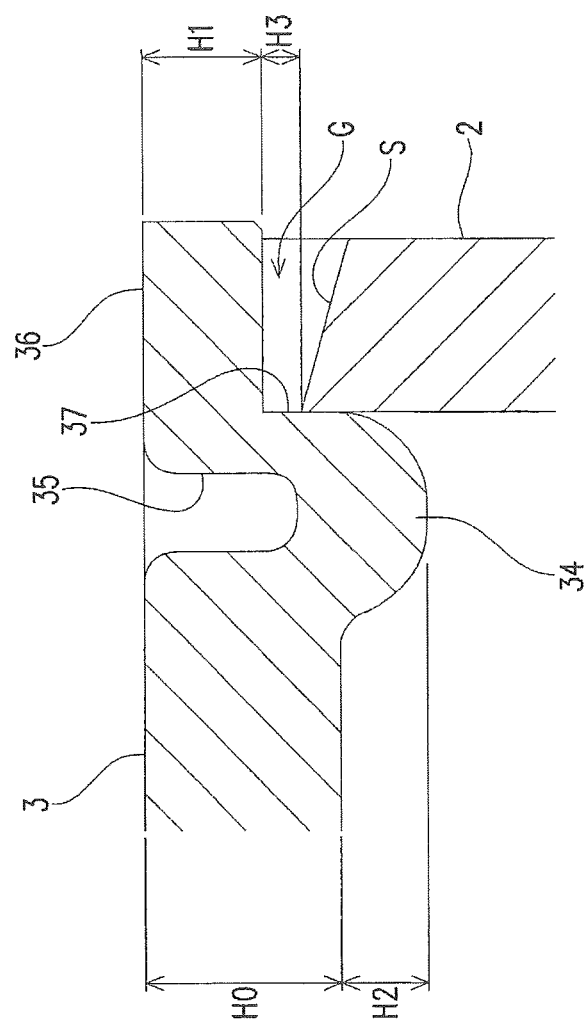
FIG. 8 is an enlarged sectional view, for explaining the height of a projecting ridge, of the cover plate according to the embodiment.

Meanwhile, in the production process of the case body 2, an unnecessary portion such as a burr remains at the opening edge of the opening 2d. In order to remove such an unnecessary portion at the opening edge of the opening 2d, the region corresponding to the second sides P2 of the pair of side plates 2b of the case body 2 and the region corresponding to the second sides P2 of the pair of end plates 2c of the case body 2 (specifically, the opening edge) are subjected to trimming. This generates a height difference in the region corresponding to the second sides P2 of the pair of side plates 2b of the case body 2 and the region corresponding to the second sides P2 of the pair of end plates 2c of the case body 2. Thereby, a step portion S as shown in FIG. 8 is formed at the opening edge of the case body 2 (hereinafter, this step portion S is referred to as "trimming step portion S").

The trimming step portion S of this embodiment is formed by trimming each of the pairs of opposite sides of the opening edge of the case body 2. The trimming step portion S is formed as follows, so that the regions provided at the opening edge of the case body 2 are reduced as much as possible. The second sides P2 of the pair of end plates 2c with a smaller width are trimmed to be lower than the second sides P2 of the pair of side plates 2b. Thus, the trimming step portion S is formed at each of the second sides P2 of the pair of end plates 2c. At this time, the position at which the trimming step portion S is formed is determined depending on the processing method and the processing accuracy for forming the opening edge of the case body 2, the acceptable amount of the unnecessary portion such as a burr, etc. For example, such a case body 2 having a rectangular opening edge as in this embodiment is produced by forming a bottomed rectangular tubular member by deep drawing, and thereafter cutting the portion where the opening edge is intended to be provided. At this time, if the portion, where the opening edge is intended to be provided, of the bottomed rectangular tubular member is cut along the long sides of the rectangular opening edge (specifically, the portion where the long sides of the opening edge are formed by cutting) in parallel thereto, the cutting starts at one short side portion and ends at the other short side portion. In such a production process, a portion such as a burr remains in the pair of short side portions, which therefore are subjected to trimming, so that the trimming step portion S is formed along the pair of short side portions. However, the remaining amount of the portion such as a burr is smaller at the position where the cutting starts than at the position where the cutting ends. Therefore, the trimming step portion S may be formed only at the position where the cutting ends. Other than that, the trimming step portion S may be locally formed at the second sides P2 of the pair of end plates 2c, or may be formed along the entire second sides P2 of the pair of end plates 2c.

Figure 4:
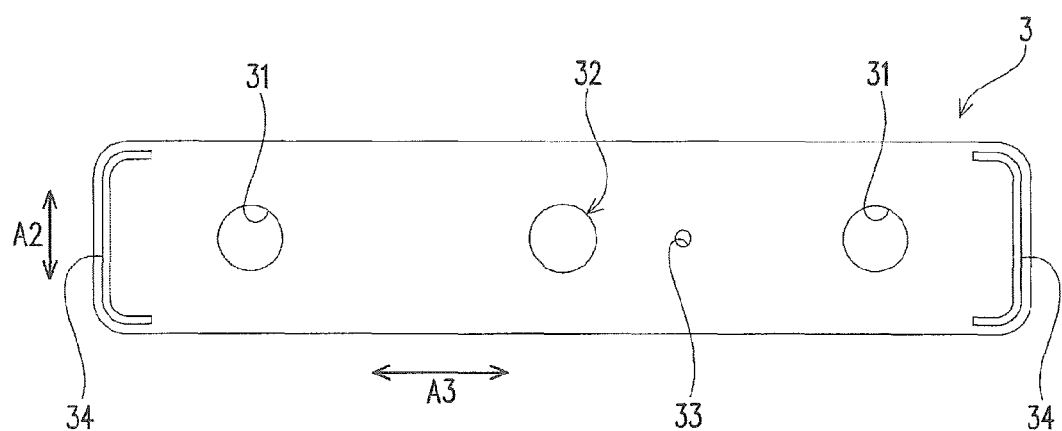
FIG. 4 is a bottom view of a cover plate of a case of the battery cell according to the embodiment.

As shown in FIG. 4, the cover plate 3 has a rectangular shape. Two through holes 31 are formed in the cover plate 3 at intervals in the third direction A3. Further, as shown in FIG. 1 to FIG. 4, a circular gas discharge valve 32 is formed integrally with the cover plate 3 at the center of the cover plate 3. A thin portion having a substantially Y-shape is formed in the gas discharge valve 32. The gas discharge valve 32 reduces the pressure in the case 1 by splitting the thin portion in the case where the internal pressure of the case 1 unusually increases. An injection hole 33 with a small diameter is formed in the cover plate 3 on a lateral side of the gas discharge valve 32. This injection hole 33 is closed by a stopper 13 after an electrolyte liquid is injected into the case 1.

Figure 5:
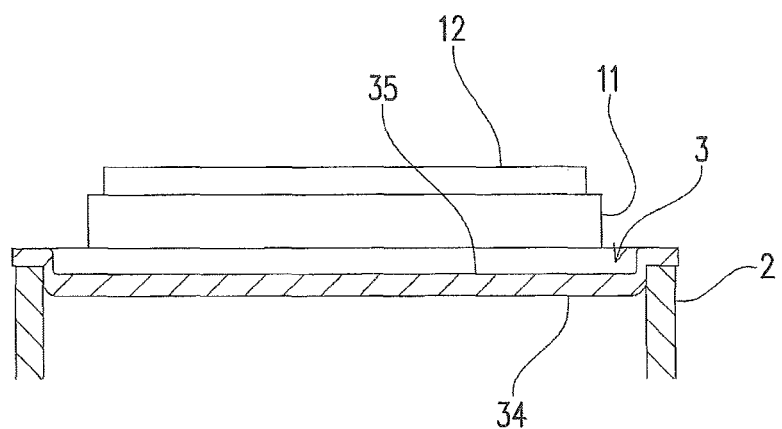
FIG. 5 is an enlarged sectional view, taken along the line V-V in FIG. 1, of the cover plate according to the embodiment.
Figure 6:
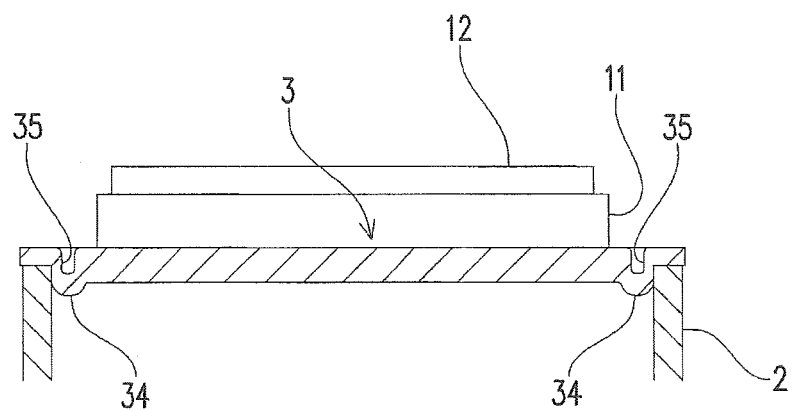
FIG. 6 is an enlarged sectional view, taken along the line VI-VI in FIG. 1, of the cover plate according to the embodiment.

The cover plate 3 includes a projection. This projection opposes, within the case 1, the trimming step portion S formed at the opening edge of the case body 2. In this embodiment, as shown in FIG. 5 and FIG. 6, a projecting ridge 34 projecting linearly from the cover plate 3 is described as an example of such a projection. The projecting ridge 34 (projection) is locally located in the vicinity of the circumference edge of the cover plate 3 on the lower surface of the cover plate 3. This projecting ridge 34 is formed on the cover plate 3 at each of the positions that conform to the second sides P2 of at least the pair of end plates 2c, corresponding to that the trimming step portion S is provided at each of the second sides P2 of the pair of end plates 2c. The projecting ridge 34 is provided on the cover plate 3 so as to be in contact with the inner surface of the opening edge of the case body 2. More specifically, the projecting ridge 34 is provided along each of the second sides P2 of the end plates 2c on the cover plate 3 inside the regions of the circumference edge portion that abut the opening edge of the case body 2. Both ends of the projecting ridge 34 reach portions of the second sides P2 of the pair of side plates 2b. The projecting ridge 34 projects from the cover plate 3 along the pair of end plates 2c of the case body 2. The projecting ridge 34 is formed by coining. That is, the projecting ridge 34 is a portion formed by depressing the cover plate 3 on the upper surface (outer surface) side of the cover plate 3 into a recess, and raising the cover plate 3 on the lower surface (inner surface) side thereof into a projection. A recess 35 is formed on the upper surface (outer surface) of the cover plate 3 at a position corresponding to the position where the projecting ridge 34 is formed on the lower surface (inside) of the cover plate 3. The capacity of the recess 35 depressed on the upper surface of the cover plate 3 is substantially the same as the volume of the projecting ridge 34 raised on the lower surface of the cover plate 3. The projecting ridge 34 has a tip portion in the projecting direction with an arcuate cross section. This can suppress the generation of metal powder, etc., due to the abrasion between the projecting ridge 34 and the inner side of the case body 2 when the cover plate 3 is fitted into the case body 2.

Figure 7:
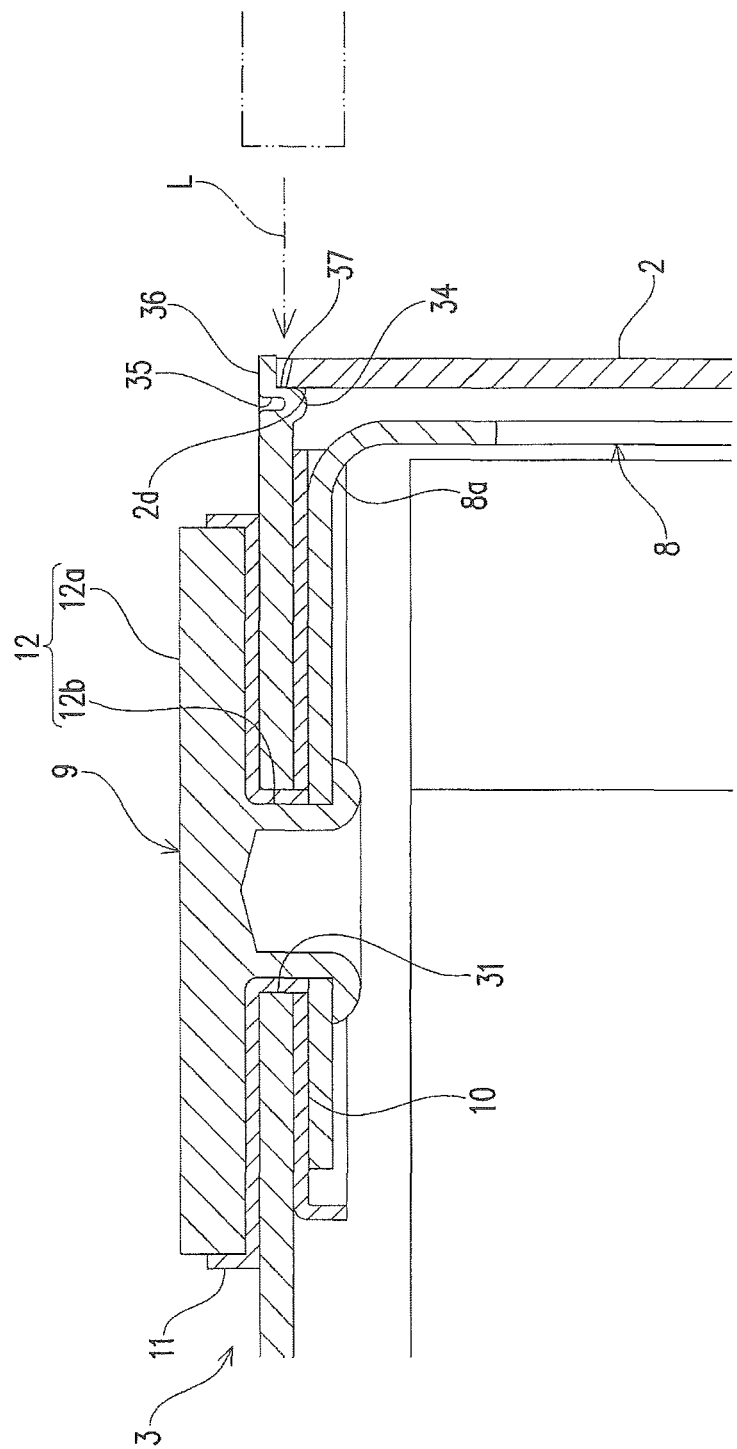
FIG. 7 is an enlarged sectional view of the cover plate of the battery cell according to the embodiment when being placed on a case body.

As shown in FIG. 7, the cover plate 3 has a thin portion 36 formed by compression molding of the lower surface side of the circumference edge portion in the thickness direction. The thin portion 36 is a portion having a reduced thickness as compared to portions of the cover plate 3 other than the thin portion 36. The thin portion 36 is formed by raising the lower surface side of the circumference edge portion one step higher in the thickness direction of the cover plate 3. Providing of the thin portion 36 allows a case inner side portion 37 that comes into contact with the inner surface of the opening edge of the case body 2 by being inserted into the opening 2*d* of the case body 2 to be formed in the cover plate 3. The thin portion 36 is provided at a portion opposing the opening edge of the opening 2*d* of the case body 2 over the entire circumference of the cover plate 3.

Here, the height in the thickness direction of the projecting ridge 34 from the upper surface of the cover plate 3 (dimension in the thickness direction) is described with reference to FIG. 8. When the height in the thickness direction of the case inner side portion 37 (the height from the upper surface of the cover plate 3) is H0, the height H1 of the thin portion 36 of the cover plate 3 is lower than the height H0 of the case inner side portion 37 (H1<H0). The projecting ridge 34 projects from the lower end of the case inner side portion 37 where the thin portion 36 of the cover plate 3 is not provided. Therefore, when the height in the thickness direction of the projecting ridge 34 itself is H2, the height of the projecting ridge 34 from the upper surface of the cover plate 3 is a value (=H0+H2) obtained by adding the height H2 of the projecting ridge 34 itself to the height H0 of the case inner side portion 37.

On the other hand, when the height difference of the trimming step portion S itself is H3, the height, from the upper surface of the cover plate 3, at the lower end of a gap G formed between the cover plate 3 and the opening edge of the opening 2*d* of the case body 2 due to forming the trimming step portion S is a value (=H1+H3) obtained by adding the height difference H3 of the trimming step portion S itself to the height H1 of the thin portion 36 of the cover plate 3. The height H2 of the projecting ridge 34 itself (H2≥H1+H3−H0) is set so that the height of the projecting ridge 34 from the upper surface of the cover plate 3 exceeds the height at the lower end of the gap G from the upper surface of the cover plate 3. Therefore, the height H2 of the projecting ridge 34 itself on the circumference edge side of the cover plate 3 (that is, the height difference between the lower surface of the thin portion 36 and the lower end of the projecting ridge 34) is increased by providing the thin portion 36 in the circumference edge portion of the cover plate 3 to the extent that the thickness of the thin portion 36 is reduced from the height H0 of the case inner side portion 37 (H0−H1), as compared to the case where the thin portion 36 is not provided in the circumference edge portion of the cover plate 3. In other words, it is possible to close the gap G formed between the cover plate 3 and the opening edge of the opening 2*d* of the case body 2 without changing the height of the projecting ridge 34 (the height of the projecting ridge 34 from the upper surface of the cover plate 3), even if the height difference H3 of the trimming step portion S is increased to the extent that the thickness of the thin portion 36 is reduced from the height H0 of the case inner side portion 37. It should be noted that the trimming step portion S according to this embodiment is formed at an angle so as to slope downwardly from the inner circumferential surface side to the outer circumferential surface at the opening edge of the case body 2. In other words, the height difference H3 of the trimming step portion S is increased from the inner circumferential surface toward the outer circumferential surface of the opening edge. In the above-mentioned relationship of the height of the projecting ridge 34, the height difference H3 of the trimming step portion S itself is preferably defined by the height difference on the inner circumferential surface side of the opening edge.

As shown in FIG. 3, the electrode assembly 4 is formed by winding a strip-shaped positive electrode sheet 5 and a strip-shaped negative electrode sheet 6 with a strip-shaped separator 7 interposed therebetween into an elongated cylindrical shape that forms a circle elongated in the up-down direction about the rotation axis in the left-right direction. At this time, the positive electrode sheet 5 and the negative electrode sheet 6 are shifted from each other in the different directions to the left and right sides. The electrode assembly 4 is housed within the case 1 while being entirely covered by an insulating cover made of an insulating sheet so as to be insulated from the case 1. The positive electrode sheet 5 is formed of an aluminum foil on the surface of which a positive electrode active material is supported. The negative electrode sheet 6 is formed of a copper foil on the surface of which a negative electrode active material is supported. The positive electrode sheet 5 and the negative electrode sheet 6 have portions that are not coated with the active materials respectively at their end edges in the shift direction on the left and right sides. In this way, the aluminum foil and the copper foil are exposed at the left and right ends of the electrode assembly 4. That is, at the left and right ends of the electrode assembly 4, metal foils of the electrodes (portions of the electrodes to which no active materials are applied) are wound into a rolled bundle.

Further, a current collector 8 is electrically connected to each of the metal foils exposed at the left and right ends of the electrode assembly 4. The current collector 8 is an electrically conductive metal member elongated in the up-down direction. More specifically, the current collector 8 for the positive electrode, for example, is formed using aluminum or aluminum alloy. The current collector 8 for the negative electrode, for example, is formed using copper or copper alloy. An upper part of the current collector 8 is folded horizontally, as shown in FIG. 7, to serve as a connecting portion 8*a*. A portion of the current collector 8 that is lower than the connecting portion 8*a* is divided into two on the front and rear sides, which project downwardly. The portion divided into two is gripped by clip plates together with the end of the electrode assembly 4 so as to be connected and fixed to the end of the electrode assembly 4, for example, by ultrasonic welding.

As shown in FIG. 3 and FIG. 7, the terminal structure 9 includes the terminal structure 9 for the positive electrode and the terminal structure 9 for the negative electrode. Each terminal structure 9 includes a resin plate 10, an outer gasket (gasket) 11, and an external terminal 12. The resin plate 10 and the outer gasket 11 are arranged on each of the left and right sides of the cover plate 3 so as to surround the through holes 31 from the inner and outer sides. The external terminal 12 is inserted through the corresponding through hole 31 via the resin plate 10 and the outer gasket 11, and is electrically connected to the connecting portion 8*a* of the current collector 8. This allows the electrode assembly 4 within the case 1 and the external terminal 12 to be electrically connected to each other.

The external terminal 12 includes the external terminal 12 for the negative electrode and the external terminal 12 for the positive electrode. Each external terminal 12 has a head 12a and a stem 12b extending downwardly from the center on the lower surface of the head 12a. A bus bar is connected to the surface (exposed surface) of the head 12a by welding. The external terminal 12 for the negative electrode, for example, is formed using copper or copper alloy. The external terminal 12 for the positive electrode, for example, is formed using aluminum or aluminum alloy.

In production of a battery cell 1 with the above-described structure, the electrode assembly 4 in which the positive electrode sheet 5, the negative electrode sheet 6, the separator 7, and the current collector 8 are assembled is first housed within the case body 2 through the opening 2d of the case body 2. Subsequently, the cover plate 3 is placed on the opening edge of the opening 2d of the case body 2 at an appropriate position. At this time, the cover plate 3 is positioned by the projecting ridge 34 with respect to the opening 2d of the case body 2. The cover plate 3 is coupled to the case body 2 by laser welding over the entire circumference of the seam with the opening 2d of the case body 2. This allows the opening 2d of the case body 2 to be closed by the cover plate 3 so that the case 1 is sealed. After the case 1 is thus sealed, the outer gasket 11 is placed on the cover plate 3, and the external terminal 12 is inserted through an opening of the outer gasket 11, the through hole 31 of the cover plate 3, and an opening of the connecting portion 8a of the current collector 8 arranged within the case 1. Then, an external force is applied from the outside of the case 1 so that the tip portion of the external terminal 12 is crimped, thereby allowing the external terminal 12 and the electrode assembly 4 to be electrically connected to each other. As a result, the battery cell 1 is accomplished.

As described above, according to the battery cell 1 of this embodiment, when the cover plate 3 is placed on the opening edge of the opening 2d of the case body 2, the gap G is formed between the cover plate 3 and the opening edge due to the trimming step portion S provided at the opening edge of the case body 2. However, the projecting ridge 34 of the cover plate 3 is arranged inside the gap G as seen from the outside of the case body 2. Therefore, even if a laser beam L enters this gap G when the seam between the opening edge of the opening 2d of the case body 2 and the cover plate 3 is laser welded, the way of the laser beam L is blocked by the projecting ridge 34 of the cover plate 3. Thus, the laser beam L does not penetrate into the case 1. Moreover, the projecting ridge 34 is merely provided partially in the cover plate 3 so as to correspond to the entire length of each of the second sides P2 of the pair of end plates 2c in which the trimming step portion S is formed. Therefore, only a capacity equivalent to the volume of the projecting ridge 34 is lost partially from the capacity of the case 1, so that the capacity inside the case 1 is not significantly reduced.

Further, when the projecting ridge 34 is provided in the cover plate 3, the weight of the cover plate 3 may well increase to the extent corresponding to the volume of the projecting ridge 34. However, since the recess 35 is provided on the outer surface side of the portion where the projecting ridge 34 is provided, the weight of the cover plate 3 can be reduced to the extent corresponding to the capacity of the recess 35. Accordingly, the laser beam L is blocked by the projecting ridge 34 so that the laser beam L does not penetrate into the case 1, while the increase in weight of the cover plate 3 is suppressed by the recess 35. Particularly, according to a method for producing the cover plate 3 of this embodiment, the projecting ridge 34 is formed by coining the cover plate 3, and therefore the weight of the cover plate 3 does not increase by providing the projecting ridge 34. Therefore, the electric storage capacity per unit weight of the battery cell 1 is also not reduced.

Further, when the cover plate 3 is placed on the opening edge of the opening 2d of the case body 2, the case inner side portion 37 of the cover plate 3 abuts the inner surface of the opening edge of the case body 2, thereby allowing the cover plate 3 to be positioned at a specific position. Further, since the circumference edge portion of the cover plate 3 is subjected to compression molding, the case inner side portion 37 of the cover plate 3 relatively enters the inside of the case body 2. The height of the projecting ridge 34 is increased to the extent that the cover plate 3 has entered the inside of the case body 2. Therefore, even if the laser beam L is about to penetrate through the gap G between the cover plate 3 and the opening edge of the case body 2 in the laser welding, the way of the laser beam L is blocked by the projecting ridge 34 of the cover plate 3 having an increased height. Thus, the laser beam L does not penetrate into the case 1.

It should be noted that the electric storage device according to the present invention is not limited to the above-mentioned embodiments, and various modifications can be made without departing from the gist of the invention.

Figure 9:
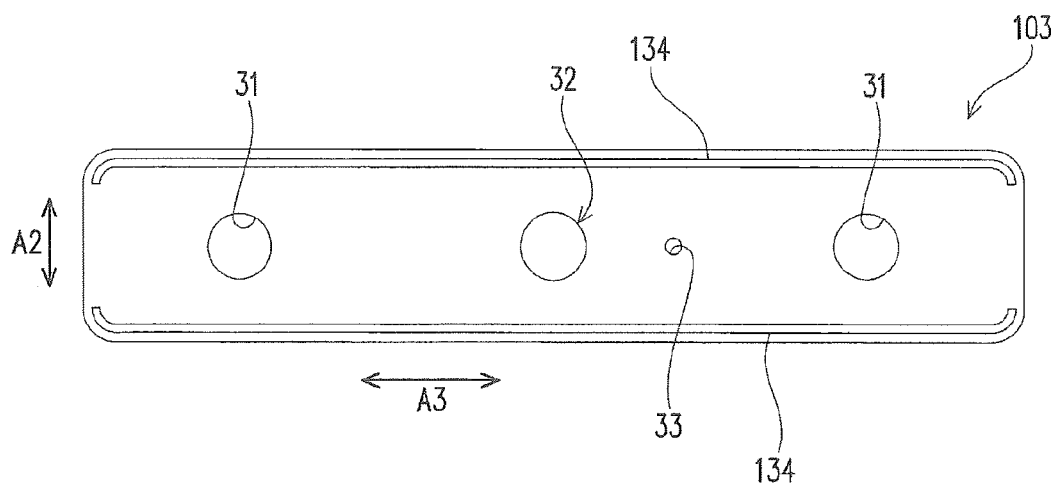
FIG. 9 is a bottom view of a cover plate according to another embodiment of the present invention.

For example, the above-mentioned embodiments describe an example in which the projecting ridge 34 is formed to be unevenly distributed in the cover plate 3 (that is, so as to be locally located in the vicinity of the circumference edge of the cover plate 3) corresponding to the second sides P2 of the pair of end plates 2c and partially to the end portions of the second sides P2 of the pair of side plates 2b. However, the projecting ridge 34 may be provided at any position as long as the position opposes the trimming step portion S within the case 1. For example, as shown in FIG. 9, projections 134 may be formed corresponding respectively to the second sides P2 of the pair of side plates 2b. The pair of projections 134 are formed along the entire length of the second sides P2 of the pair of side plates 2b, and both ends of the pair of projections 134 reach the connecting portions between the side plates 2b and the end plates 2c. That is, both ends of the projections 134 are bent (curved) inwardly, and the projections 134 between the ends extend linearly. When a step portion is provided on each of the second sides P2 of the pair of side plates 2b of the opening edge of the case body 2, penetration of the laser beam can be prevented. Further, the configuration of a cover plate 103 provided with the pair of projections 134 enables the cover plate 103 to be positioned in the second direction A2 with respect to the opening 2d of the case body 2, in addition to the prevention of the laser penetration.

Figure 10:
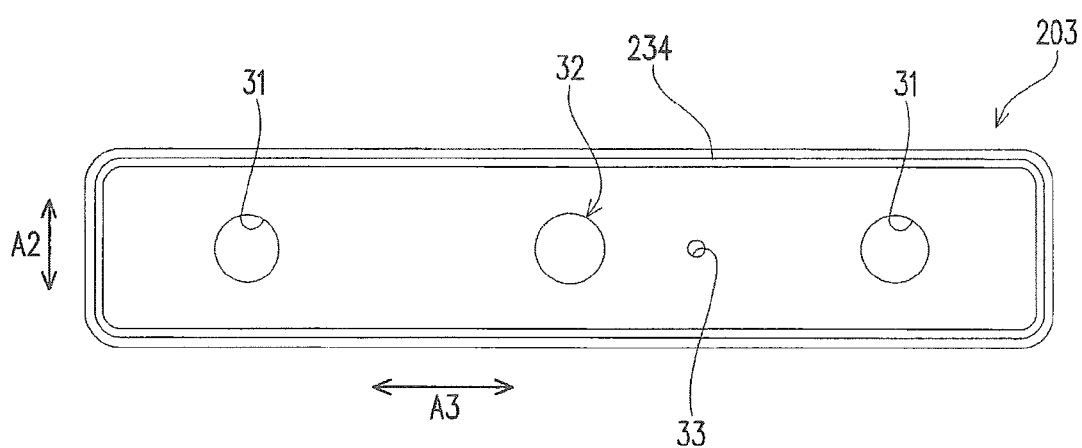
FIG. 10 is a bottom view of a cover plate according to still another embodiment of the present invention.

Further, as shown in FIG. 10, a projection 234 may be formed to have an annular shape that extends along the inside of the opening edge of the case body 2. Even if the step portion is formed at any position of the opening edge of the case body 2, the projection 234 of a cover plate 203 is arranged inside the gap formed between the cover plate 203 and the opening edge. In the laser welding, even if the laser beam is about to penetrate through the gap formed between the cover plate 203 and the opening edge, the way of the laser beam is blocked by the projection 234 of the cover plate 203. Thus, the laser beam does not penetrate into the case 1. Further, since the projection 234 is merely formed to have an annular shape that extends along the inside of the opening edge of the case body 2, only a capacity equivalent to the volume of the projection 234 is lost partially from the capacity of the case 1. Therefore, the capacity inside the case 1 is not significantly reduced. Further, the configuration of the cover plate 203 provided with the projection 234 having an annular shape enables the cover plate 203 to be positioned in both the second direction A2 and the third direction A3 with respect to the opening 2d of the case body 2, in addition to the prevention of the laser penetration.

Figure 11:
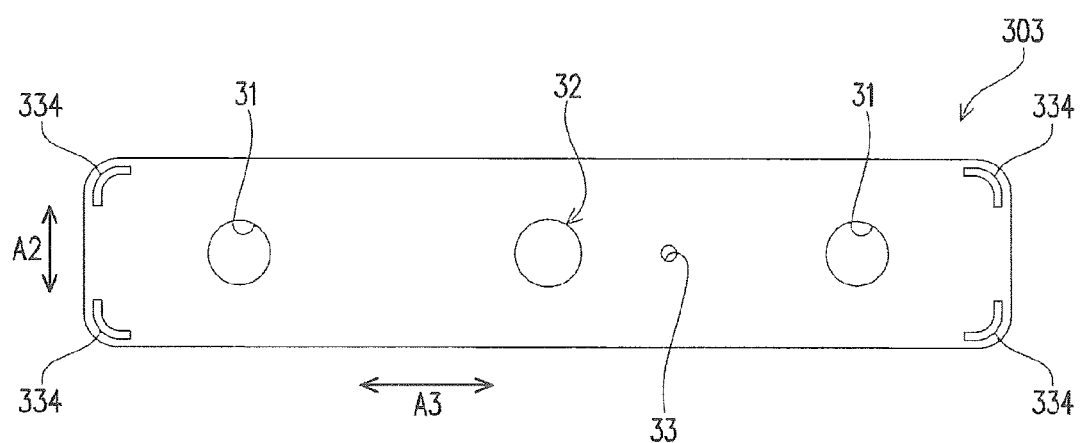
FIG. 11 is a bottom view of a cover plate according to still another embodiment of the present invention.

Further, as shown in FIG. 11, a projection 334 may be formed corresponding to each of the connecting portions (the corner portions of the case body 2) of the opening edge of the case body 2 between the side plates 2b and the end plates 2c. The projection 334 may be formed corresponding to each of the connecting portions (four corners) between the side plates 2b and the end plates 2c in the case body 2, or may be formed corresponding to some of the connecting portions between the side plates 2b and the end plates 2c. In such a case, when the corners of the case body 2 are trimmed, and a step portion is formed at the connecting portions between the side plates 2b and the end plates 2c of the opening edge of the case body 2, the laser penetration can be prevented. Further, the configuration in which the projection 334 is provided corresponding to each of the (four) connecting portions of the case body 2 enables a cover plate 303 to be positioned in both the second direction A2 and the third direction A3 with respect to the opening 2d of the case body 2, in addition to the prevention of the laser penetration.

Figure 12:
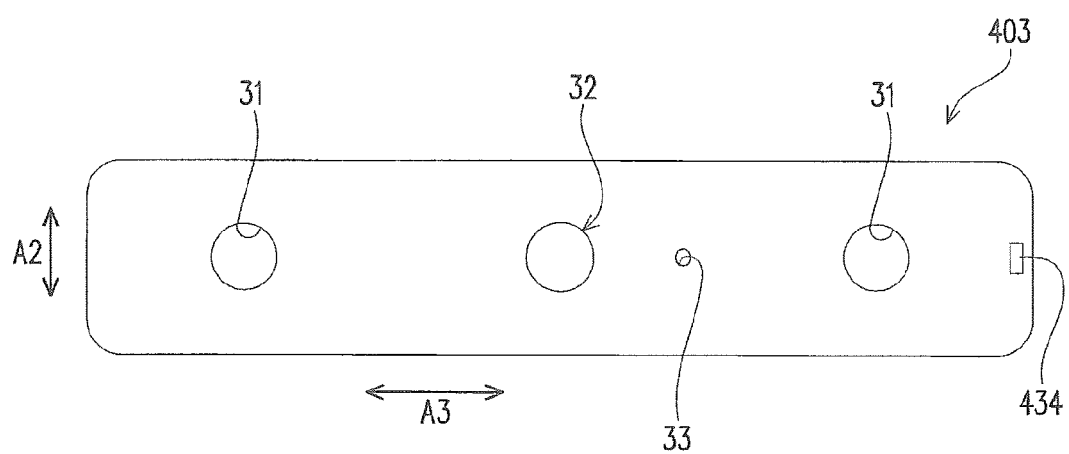
FIG. 12 is a bottom view of a cover plate according to still another embodiment of the present invention.

The above-mentioned embodiments describe an example in which the projection 34 is formed corresponding to each of a pair of the opposed sides of the sides that constitute the substantially rectangular opening edge of the case body 2. However, as shown in FIG. 12, a projection 434 may be formed corresponding to at least one of the sides that constitute the substantially rectangular opening edge of the case body 2. Moreover, this projection 434 may be locally formed corresponding to a portion of the one side. For example, in the case where the step portion is formed of a notch or a recess that is provided at the opening 2d of the case body 2 for optically detecting the orientation of the case 1, the way of the laser beam is blocked in the laser welding by the projection 434 when the projection 434 is provided corresponding to the position where the step portion is formed.

Figure 13:
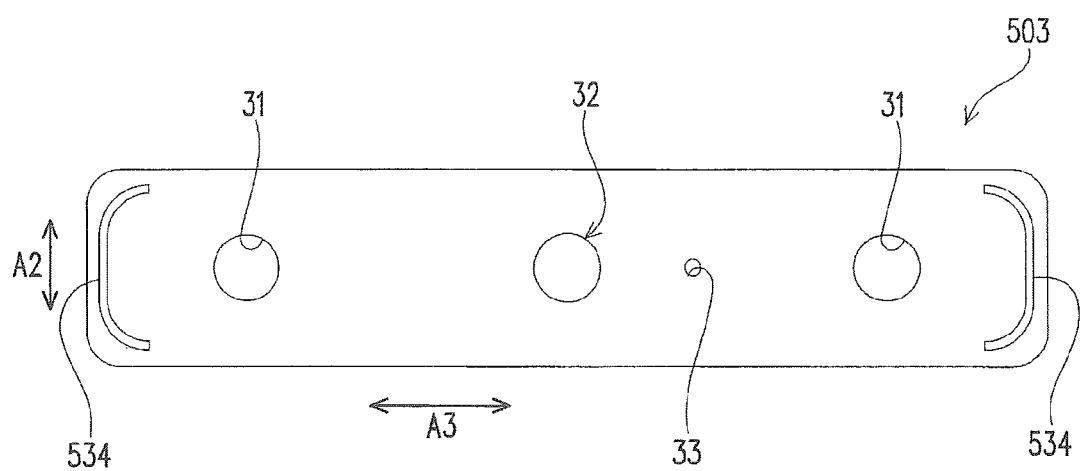
FIG. 13 is a bottom view of a cover plate according to still another embodiment of the present invention.

Further, as shown in FIG. 13, a pair of projections 534 may be configured as follows. Both ends of the projections 534 are in abutting or adjacent contact with the side plates 2b at the opening 2d of the case body 2, and the center portions of the projections 534 are in abutting or adjacent contact with the end plates 2c. On the other hand, the portions between both ends and the center portions of the projections 534 are not in abutting or adjacent contact with the connecting portions between the side plates 2b and the end plates 2c of the case body 2. When a step portion is provided at the second sides P2 of the pair of end plates 2c of the opening edge of the case body 2, penetration of the laser beam can be prevented. Further, the configuration of a cover plate 503 provided with a pair of the projections 534 enables the cover plate 503 to be positioned in both the second direction A2 and the third direction A3 with respect to the opening 2d of the case body 2, in addition to the prevention of the laser penetration.

Figure 14:
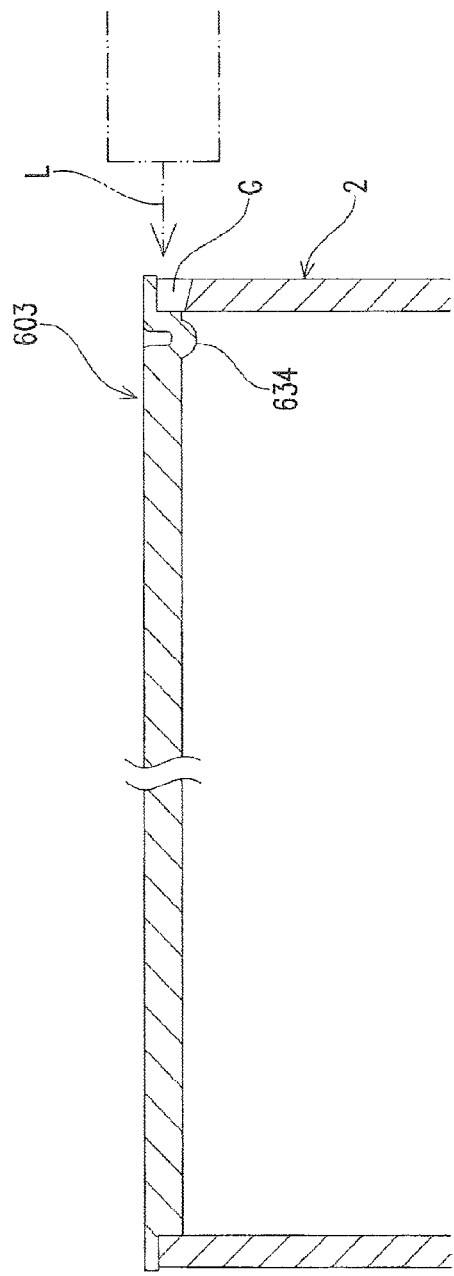
FIG. 14 is an enlarged sectional view of a case body and a cover plate according to still another embodiment of the present invention.

Further, the above-mentioned embodiments describe an example in which the projecting ridge 34 (projection) is in contact with the inner surface of the opening edge of the case body 2. However, as shown in FIG. 14, a projection 634 may be adjacent to the inner surface of the opening edge of the case body 2. Also in this case, the projection 634 blocks, when the seam between a cover plate 603 and the opening edge of the case body 2 is irradiated with the laser beam L in parallel, the way of the laser beam L that has penetrated through the gap G formed between the cover plate 603 and the opening edge into the case 1. This can prevent the laser beam L from further entering the inside of the case 1 over the position where the projection 634 is provided.

Figure 15:
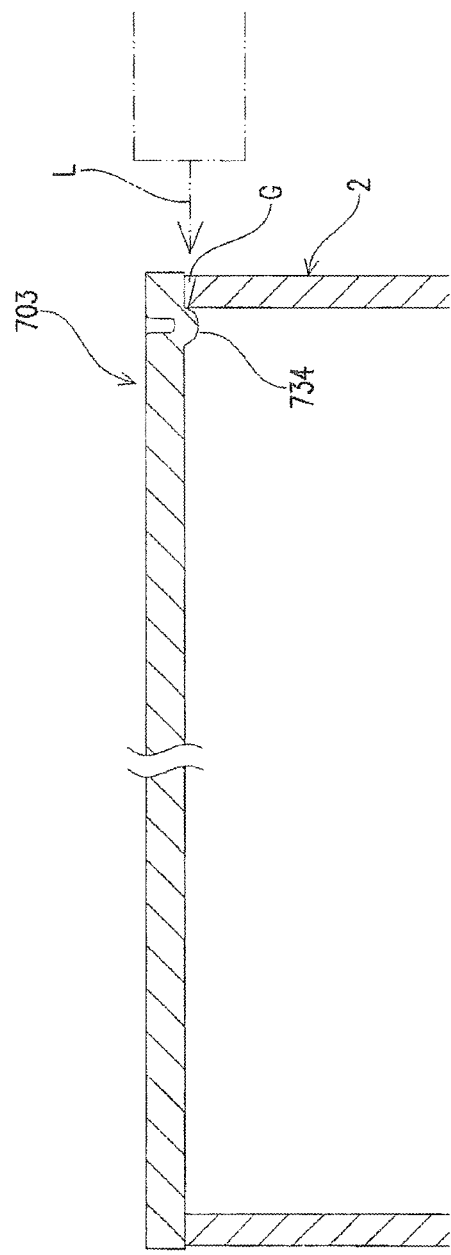
FIG. 15 is an enlarged sectional view of a case body and a cover plate according to still another embodiment of the present invention.
Figure 16:
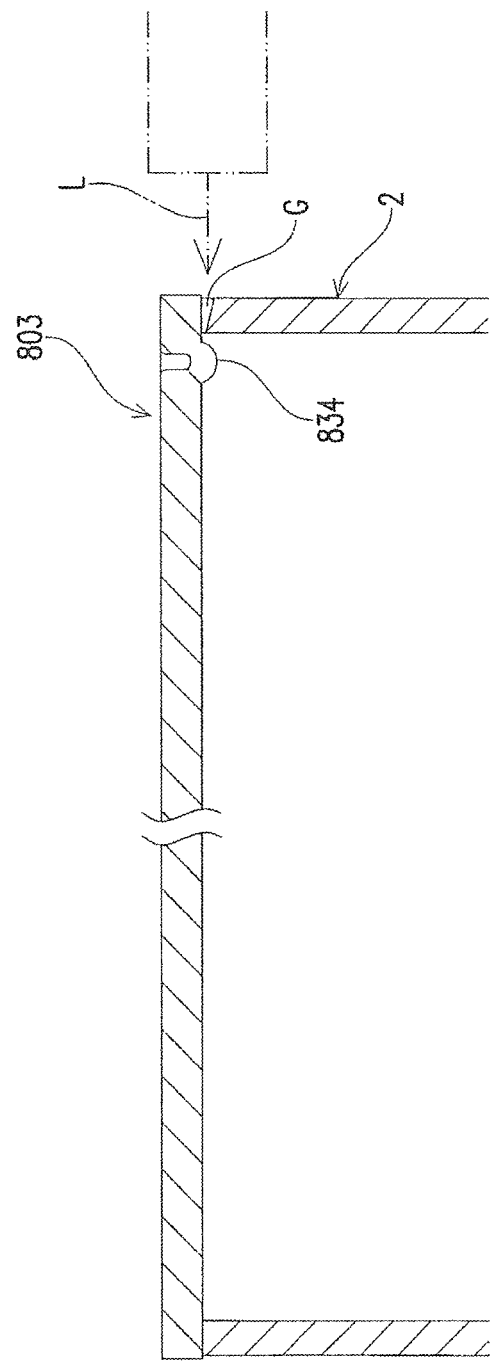
FIG. 16 is an enlarged sectional view of a case body and a cover plate according to still another embodiment of the present invention.

Further, the above-mentioned embodiments describe an example in which the thin portion 36 is provided in the circumference edge portion of the cover plate 3. However, as shown in FIG. 15, the cover plate 3 does not need to be provided with the thin portion 36. In this case, only a projection 734 closes the gap G formed between a cover plate 703 and the opening edge due to the step portion, and the projection 734 blocks the way of the laser beam L penetrating through the gap G formed between the cover plate 703 and the opening edge. Thus, the laser beam L does not penetrate into the case 1. Further, as shown in FIG. 16, a projection 834 may be adjacent to the inner surface of the opening edge of the case body 2. Also in this case, the projection 834 blocks the way of the laser beam L, when the laser beam L with which the seam between the opening edge of the case body 2 and a cover plate 803 is irradiated in parallel has penetrated thereinto through the gap G formed between the cover plate 803 and the opening edge. This can prevent the laser beam L from further entering the inside of the case 1 over the position where the projection 834 is provided.

Further, the above-mentioned embodiments describe an example in which the pair of projecting ridges 34 are provided respectively on both end sides of the cover plate 3. However, as shown in FIG. 14 to FIG. 16, a projection 634, 734, 834 may be provided only on one end side of a cover plate 603, 703, 803. When a step portion is provided on one side of the opening edge of the case body 2, penetration of the laser can be prevented.

Figure 17:
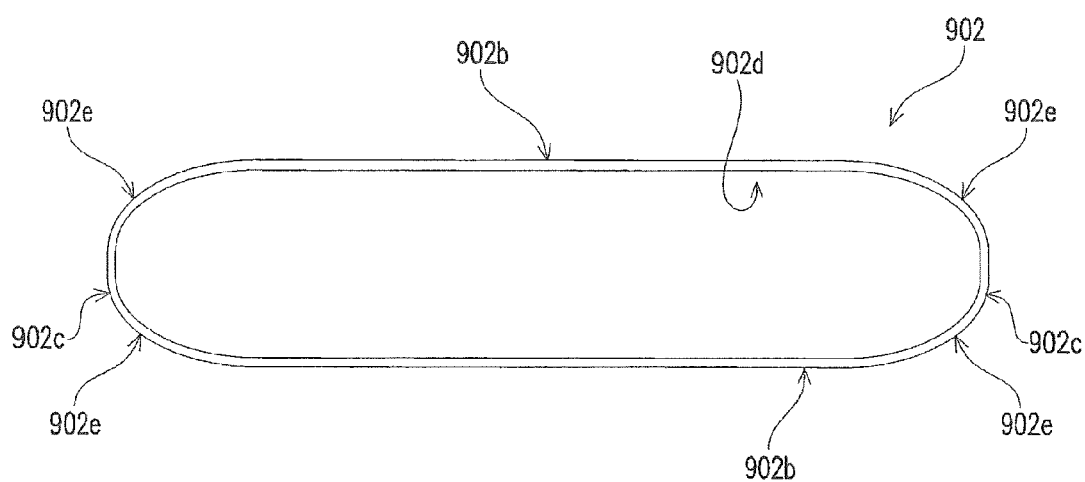
FIG. 17 is a top view of a case body according to still another embodiment of the present invention.
Figure 18:
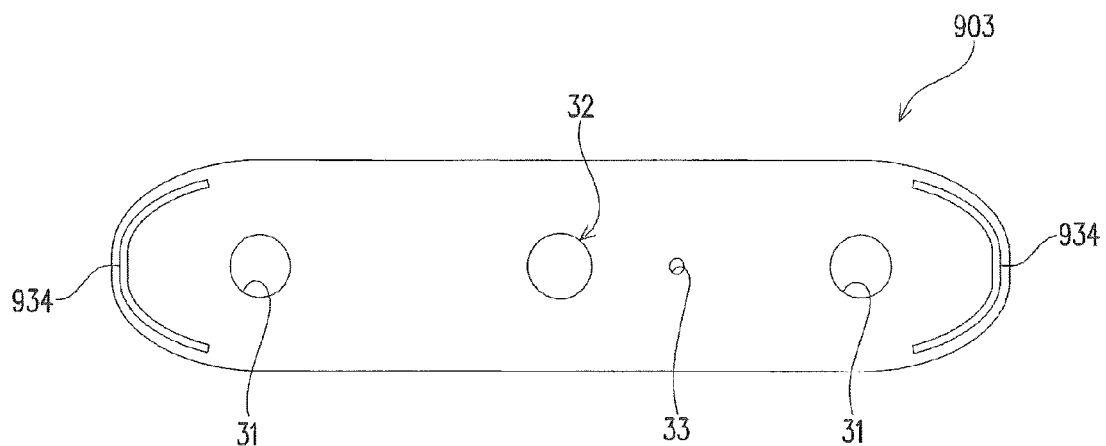
FIG. 18 is a bottom view of a cover plate according to the embodiment.

The above-mentioned embodiments describe an example in which the case body 2 has a bottomed quadrangular tubular shape, and the cover plate 3 is a rectangular plate member. That is, an example in which the case 1 has a quadrangular box shape is indicated. However, as shown in FIG. 17, the present invention can be applied to a case body 902 having a shape such that an opening edge 902d has a plurality of corner portions 902e, and a plurality of sides 902b and 902c that connect adjacent corner portions 902e. The plurality of sides 902b correspond to the side plates 2b in the above-mentioned embodiments. The plurality of sides 902c correspond to the end plates 2c in the above-mentioned embodiments. In the case of the case body 902 having the opening edge with a shape that includes the corner portions 902e, a pair of projections 934 are each provided in a cover plate 903 so as to be in contact with or adjacent to two adjacent corner portions 902e and the side 902c between the corner portions 902e, as shown in FIG. 18. The pair of projections 934 are each formed along the two adjacent corner portions 902e and the side 902c between the corner portions 902e. That is, the projections 934 are each formed into a so-called C shape. When the cover plate 903 is placed on the opening edge of the opening 902d of the case body 902, the plurality of projections 934 formed on the cover plate 903 as above are in contact with or adjacent to the plurality of corner portions 902e of the opening edge of the case body 902. Also in this case, when the step portion is formed at the plurality of corner portions 902e, the projections 934 block the laser beam that is about to penetrate through the gap formed between the cover plate 903 and the opening edge or the way of the laser beam that has penetrated therethrough, or prevent the laser beam from entering the inside of the case 1 or prevent it from further entering thereinside. The projections 934 are merely formed at the plurality of corner portions 902e of the opening 902d of the case body 902. Therefore, only a capacity equivalent to the volume of the projections 934 is lost partially from the capacity of the case, and the capacity inside the case 1 is not significantly reduced. Further, the configuration of the cover plate 903 provided with the pair of projections 934 enables the cover plate 903 to be positioned in both the second direction A2 and the third direction A3 with respect to the opening 902d of the case body 902, in addition to the prevention of the laser penetration.

The pair of projections 934 may be provided in the cover plate 903 so as to be in contact with or adjacent to at least one of the plurality of corner portions 902e. Also in this case, when the step portion is formed at the plurality of corner portions 902e, the projections 934 block the way of the laser beam that is about to penetrate, or that has penetrated, through the gap formed between the cover plate 903 and the opening edge, or prevents the laser beam from entering the inside of the case 1 or prevent it from further entering thereinside.

Figure 19:
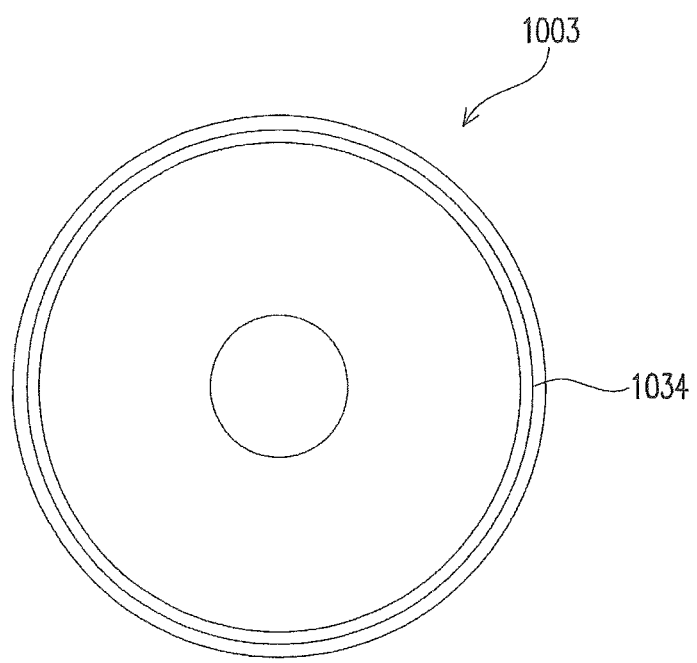
FIG. 19 is a bottom view of a cover plate according to still another embodiment of the present invention.
Figure 20:
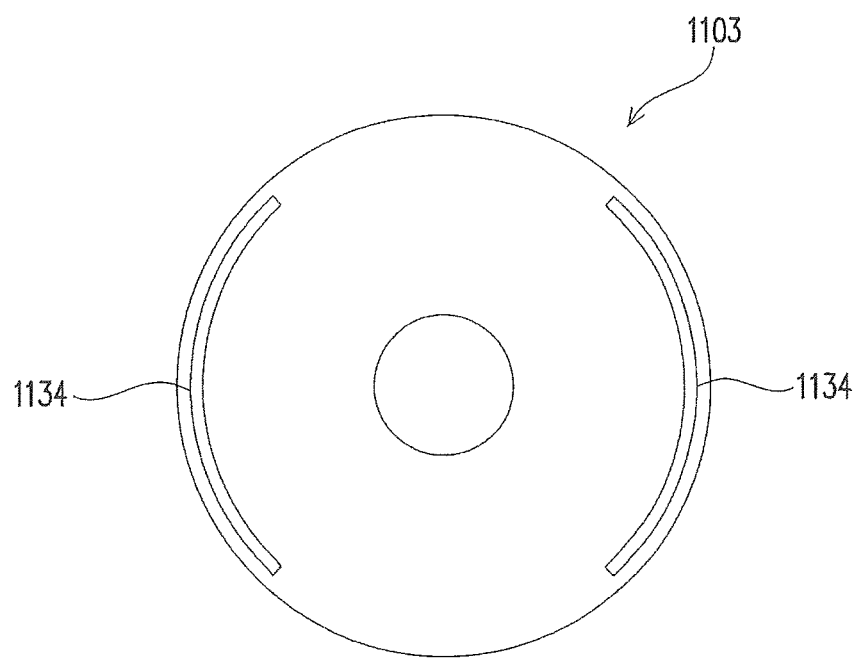
FIG. 20 is a bottom view of a cover plate according to still another embodiment of the present invention.

The present invention can be applied to a case in which a case body has a bottomed cylindrical shape, and a cover plate 1003, 1103 is a circular plate member that closes the opening of the case body, as shown in FIG. 19 and FIG. 20. In this case, as shown in FIG. 19, a projection 1034 having an annular shape may be provided on the cover plate 1003 so as to oppose the entire inner circumference of the case body. Further, as shown in FIG. 20, a projection 1134 having an arcuate shape may be provided on the cover plate 1103 so as to oppose portions of the inside of the case body. Also in these embodiments, when the projection 1034, 1134 is provided at a position corresponding to the step portion formed at the opening edge of the opening 2d of the case body 2, it is possible to suppress the penetration of the laser beam into the case body in laser welding.

Further, the above-mentioned embodiments describe an example in which the current collector 8 for the positive electrode and the external terminal 12 for the positive electrode are formed using aluminum or aluminum alloy, and the current collector 8 for the negative electrode and the external terminal 12 for the negative electrode are formed using copper or copper alloy. However, the materials for the current collectors 8 and the external terminals 12 are arbitrarily selected as long as being an electrically conductive metal material corresponding to the type of the battery cell. Further, the above-mentioned embodiments also exemplify the materials for the external terminals 12. However, the materials for the external terminals 12 are arbitrarily selected as long as being an electrically conductive metal material that has suitable properties such as strength and conductivity.

Further, the electrode assembly 4 is not limited to those of a wound type with an elongated cylindrical shape, as in the above-mentioned embodiments, and may have another shape. The electrode assembly, for example, may be of a stack type in which a plurality of positive electrode sheets and a plurality of negative electrode sheets are alternately stacked via separators.

Further, the above-mentioned embodiments describe an example in which the case 1 is formed using aluminum alloy, steel, or the like. However, the material for the case 1 (the case body 2 and the cover plate 3) is arbitrarily selected as long as being a metal material. Further, the shape and the structure of the case 1 (the case body 2 and the cover plate 3) are also not limited to the above-mentioned embodiments, and are arbitrarily selected.

Further, the above-mentioned embodiments describe an example in which the trimming step portion S is formed in the case body 2. However, the step portion may be composed of a notch or a recess that is formed intentionally in part of the opening in order to optically detect the orientation of the case in some cases. Further, the step portion may be formed unintentionally due to errors in dimensional accuracy when producing the components or slight bumps. The present invention is applicable also to these cases.

Further, the above-mentioned embodiments describe an example in which the thin portion 36 is produced by compression molding of the cover plate 3. However, the method for forming the thin portion in the cover plate is not limited thereto. For example, the thin portion may be molded integrally with the cover plate using a press working capable of forming such a thin portion. Further, when the cover plate is produced by pressing, the pressing may be performed so that the thin portion is formed together.

Further, the above-mentioned embodiments describe a lithium ion secondary battery cell. However, the type or the size (capacity) of the battery cell is arbitrarily selected.

Further, the present invention is not limited to the lithium ion secondary battery cell. The present invention can be applied also to primary battery cells and capacitors such as electric double layer capacitors, in addition to various secondary battery cells.

Figure 21:
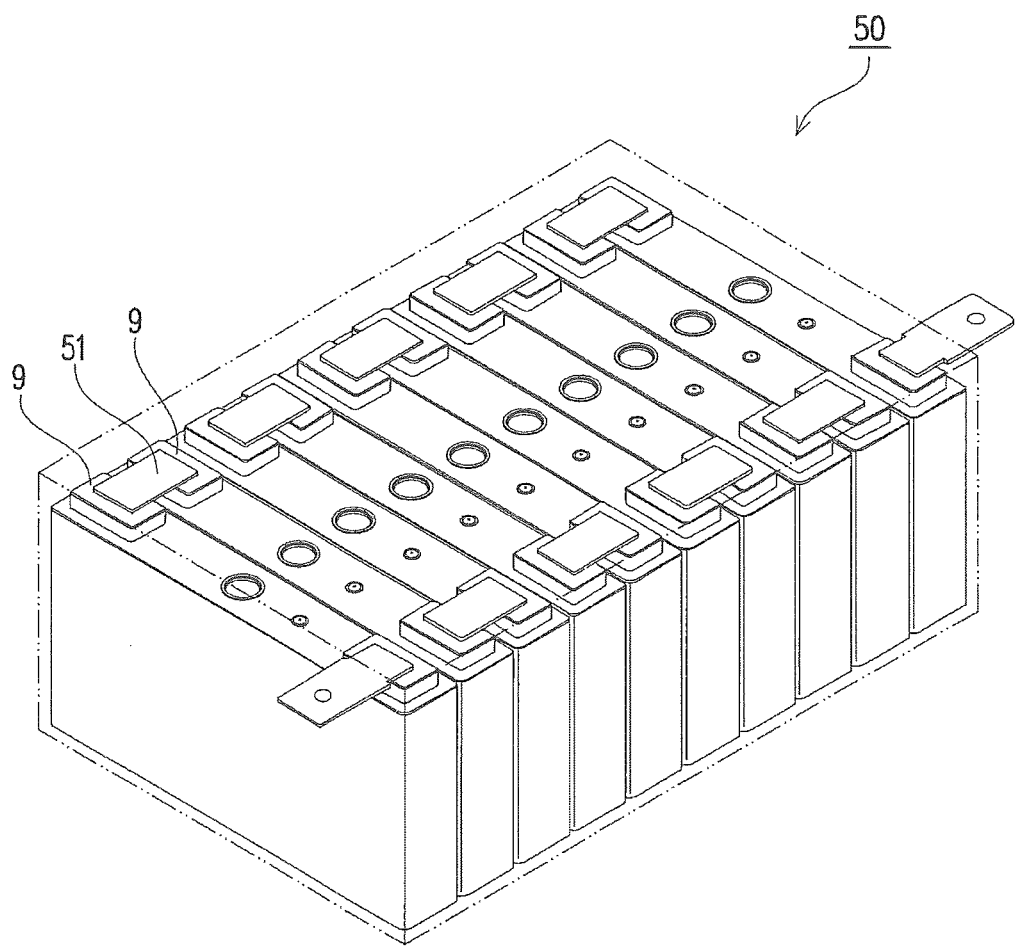
FIG. 21 is a perspective view of an electric storage apparatus including the electric storage device according to the present invention.

The electric storage device (for example, a battery cell) may be used for an electric storage apparatus (a battery module in the case where the electric storage device is a battery cell) 50 as shown in FIG. 21. This electric storage apparatus 50 has at least two electric storage devices and a bus bar member 51 that electrically connects the two (different) electric storage devices to each other. Further, the electric storage apparatus includes a coupling member that couples the at least two electric storage devices to each other. In this electric storage apparatus, the technique of the present invention needs to be applied only to at least one of the electric storage devices.

REFERENCE SIGNS LIST

1 Case
2 Case Body
2a Bottom
2b Side Plate
2c End Plate
2d Opening
3 Cover Plate
31 Through Hole
32 Gas Discharge Valve
33 Injection Hole
34 Projecting Ridge (Projection)
35 Recess
36 Thin Portion
37 Case Inner Side Portion
4 Electrode Assembly
5 Positive Electrode Sheet
6 Negative Electrode Sheet
7 Separator
8 Current Collector
8a Connecting Portion
9 Terminal Structure
10 Resin Plate
11 Outer Gasket 12 External Terminal
12a Head
12b Stem
13 Stopper
103 Cover Plate
134 Projection
203 Cover Plate
234 Projection
303 Cover Plate
334 Projection
403 Cover Plate
434 Projection
503 Cover Plate
534 Projection
603 Cover Plate
634 Projection
703 Cover Plate
734 Projection
803 Cover Plate
834 Projection
902 Case Body
902b Side Plate
902c End Plate
902d Opening
902e Corner Portion
903 Cover Plate
934 Projection
1003 Cover Plate
1034 Projection
1103 Cover Plate
1134 Projection
50 Electric Storage Apparatus
51 Bus Bar Member
A1 First Direction
A2 Second Direction
A3 Third Direction
P1 First Side
P2 Second Side
P3, P4 Side
S Trimming Step Portion
G Gap

What is claimed is:

1. A method for producing an electric storage device, the device comprising:
an electrode assembly comprising a positive electrode plate and a negative electrode plate that are insulated from each other; and
a case that houses the electrode assembly and comprises a case body having an opening, and a cover plate configured to cover the opening of the case body, the method comprising:
irradiating a seam between the cover plate and an opening edge of the case body with a laser, with the cover plate being placed on the opening edge of the opening of the case body,
wherein the case body comprises a step portion at the opening edge,
wherein the cover plate comprises a projection that is inserted into the opening of the case body,
wherein at least a portion of the projection opposes the step portion within the case body,
wherein the seam is irradiated with the laser at a position corresponding to the step portion in the laser irradiation step, and
wherein the step portion extends from an outer surface of the case body toward an inner surface of the case body such that the step portion is non-perpendicular to the inner surface of the case body to provide a gap between the cover plate and the opening edge of the opening of the case body.

2. The method for producing an electric storage device according to claim 1, wherein the projection is formed by coining the cover plate from the outer surface of the case body toward the inner surface of the case body.

3. The method for producing an electric storage device according to claim 1, wherein a circumference edge portion of the cover plate, which is placed on the opening edge of the case body, is subjected to a compression molding.

4. The method for producing an electric storage device according to claim 1, wherein the projection is locally located in a vicinity of a circumference edge of the cover plate.

5. The method for producing an electric storage device according to claim 1, wherein the projection includes an outer circumferential edge spaced at a distance from an inner surface of the opening edge.

6. The method for producing an electric storage device according to claim 1, wherein the projection has a linear shape that extends along the opening edge of the case body.

7. The method for producing an electric storage device according to claim 1, wherein the projection includes a tip in a projecting direction with an arcuate cross section.

8. The method for producing an electric storage device according to claim 1, wherein the cover plate comprises a case inner side portion that is inserted into the opening of the case body, and a thin portion that is formed around a circumference edge of the cover plate and has a thickness smaller than the case inner side portion,
wherein the projection projects from the case inner side portion, and
wherein $H2 \geq H1+H3-H0$ is satisfied, when a dimension in a thickness direction of the case inner side portion is $H0$, a dimension in the thickness direction of the thin portion is $H1$, a dimension in a thickness direction of the projection is $H2$, and a height difference in a thickness direction of the step portion is $H3$.

9. A method for producing a cover plate configured to cover an opening of a case body that houses an electrode assembly comprising a positive electrode plate and a negative electrode plate that are insulated from each other, the method comprising:
forming a projection that opposes, within the case body, a step portion formed at an opening edge of the opening of the case body, with the cover plate being placed on the opening edge, by coining the cover plate at a corresponding position from an outer surface of the case body toward an inner surface of the case body, the step portion being non-perpendicular to the inner surface of the case body to provide a gap between the cover plate and the opening edge of the opening of the case body.

10. The method for producing a cover plate according to claim 9, wherein a circumference edge portion of the cover plate, which is placed on the opening edge of the case body, is subjected to a compression molding.

11. The method for producing an electric storage device according to claim 1, wherein the projection extends, in a first direction, linearly along the opening edge of the case body, and
wherein the projection includes a ridge that, in a second direction perpendicular to the first direction, protrudes from a linear portion of the cover plate toward inside of the case.

* * * * *